May 12, 1964

H. M. BUSEY 3,132,997

HOMOGENEOUS REACTOR FUELED WITH SUSPENDED
PARTICULATE IN THE COOLANT

Filed June 5, 1962

INVENTOR.
Harold M. Busey
BY

INVENTOR.
Harold M. Busey

United States Patent Office 3,132,997
Patented May 12, 1964

3,132,997
HOMOGENEOUS REACTOR FUELED WITH SUSPENDED PARTICULATE IN THE COOLANT
Harold M. Busey, Los Alamos, N. Mex., assignor to the United States of America as represented by the United States Atomic Energy Commission
Filed June 5, 1962, Ser. No. 200,293
3 Claims. (Cl. 176—40)

The present invention relates to nuclear reactors, and more particularly to a novel nuclear reactor utilizing nuclear fuel in particulate form.

For some time it has been accepted in the art that the use of powdered fuel in the form of a slurry would have a number of advantages. Among these advantages is the fact that the fuel is mobile and can be replaced during the operation of the reactor. Change in shape of the particles due to high burnup does not decrease the value of the material as a fuel. In addition, some of the fission products can diffuse from the fuel particles to the coolant and thus be removed from the fuel, thus effecting some inpile reprocessing.

The main difficulty to the utilization of fuel in particulate form as a settled slurry in the reaction zone has been the lack of a reliable mechanism for ensuring its circulation in contact with the coolant.

It is an objective of the present invention to provide a nuclear reactor which utilizes fuel in particulate form and which reliably circulates the fuel in and about the reaction zone in intimate contact with the coolant. It is a further object of the present invention to provide a nuclear reactor which utilizes liquid sodium as a coolant and oxides of uranium, thorium, or plutonium as the fuel. These and other objects and advantages will become apparent from a reading of the following specification with reference to the drawing made a part thereof.

Figure 1:
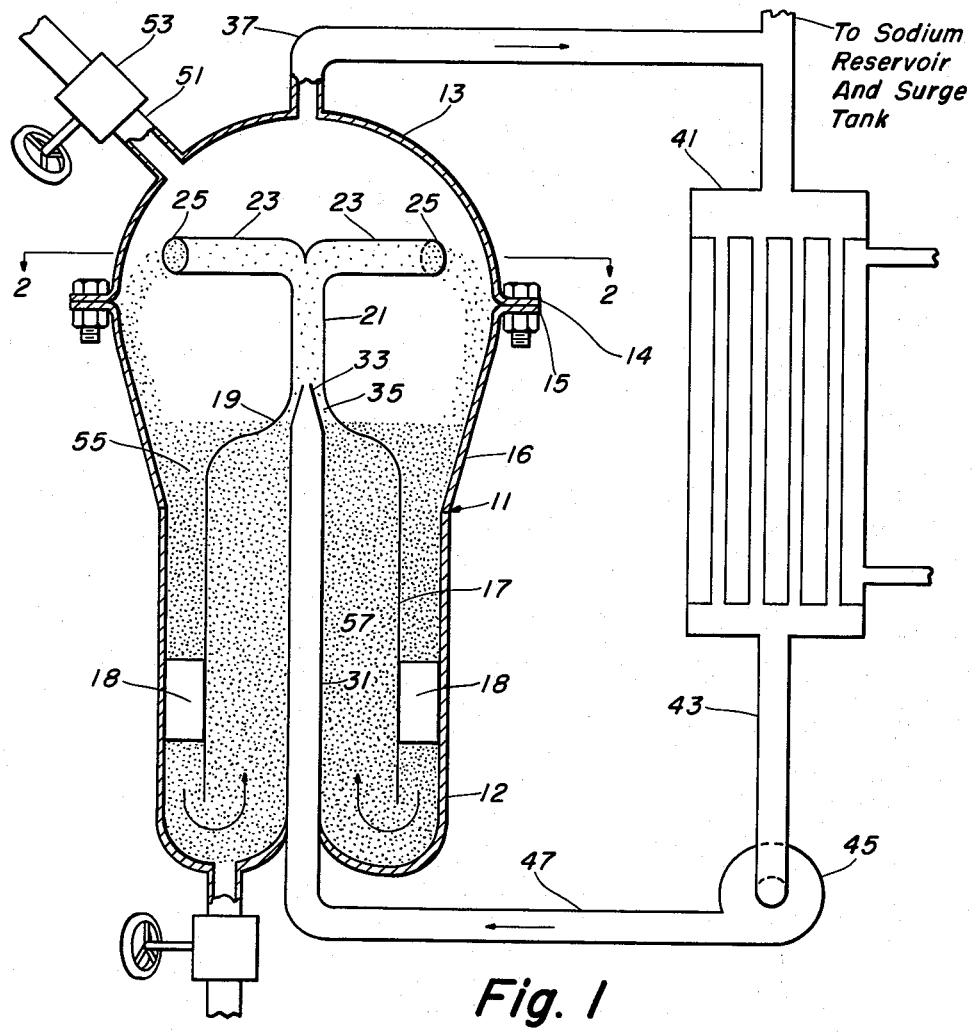
FIGURE 1 is a vertical cross section of one embodiment of the present invention showing the internal components thereof.
Figure 2:
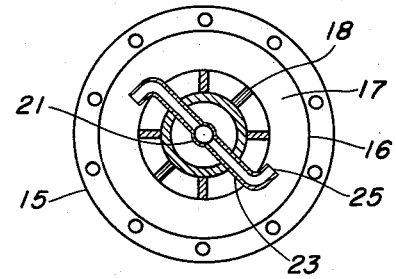
FIGURE 2 is a sectional view on plane 2—2 of FIGURE 1.

*Apparatus.*—The preferred embodiment of the present invention shown in FIGURES 1 and 2 comprises an inverted flask-shaped reactor vessel 11, preferably fabricated from stainless steel and having a lower cylindrical portion 12, a detachable, approximately hemispherical portion 13 having a flange 14 sealed to the upper flange 15 of an intermediate funnel-shaped portion 16. A cylindrical inner member 17 is supported in the interior of the cylindrical portion 12. The upper portion of the cylindrical member 17 is reduced in diameter by an ogee or streamlined section 19 which terminates at its upper end in a tubular portion 21. To the upper end of the tubular section 21, at least one radial tube 23 is connected, the outer end of which is formed into a substantially tangentially directed orifice 25. The radial arm 23, orifice 25 and dome 13 of reactor vessel 11 together form a centrifuge.

A coolant riser tube 31 is supported axially in reactor vessel 11 and extends from the bottom wall of reactor vessel 11 to the converging portion 19 of inner member 17. The upper end of tube 31 is provided with a jet portion 33 which cooperates with the entrant neck portion of tube 21 to form an ejector 35.

Coolant tube 37 passes through a hermetically sealed joint in the central portion of the reactor dome 13 and extends from thence to a heat exchanger 41. The exit tube 43 of the heat exchanger is connected through a circulating pump 45 (which may be of the electromagnetic type) through tube 47 to the lower end of riser tube 31 in the reactor. The reactor, heat exchanger and connecting tube are substantially filled with molten sodium and the reactor is slowly charged through charging tube 51 and gate 53 with comminuted uranium dioxide, plutonium dioxide, thorium dioxide, or a mixture of any of these, until the desired level of energy production is reached. It is estimated that a quantity of about 100 kilograms of fuel is needed in a reactor of 30 centimeters diameter with a reaction zone 30 centimeters long, although this quantity may vary more or less with the exact geometry and composition of the system, the rate of coolant flow, and the degree of enrichment of the fuel. Since fertile atoms can be incorporated in the oxide particles and the vessel involves a minimum of structural materials breeding is possible.

The fuel particles descend into a settled paste in the annular space 55 which is defined by the inner surface of reactor vessel 11 and the outer wall of inner member 17 and rise to fill the annular space between member 17 and riser tube 31. The ejector 35 creates a reduced pressure extending through the slurry. As the reactor is charged with fuel, the ejector is in operation and sodium is circulated through the ejector up to 21 and out of the centrifuge and down along the inner walls of the reactor vessel 11. As the amount of fuel in the reactor is increased, the quantity of the fuel in the annular space 57 increases until the desired level of settled paste is reached. The safety of the system is enhanced in that an optimum geometry is used for the critical zone, a minimum of fuel is in the system and the fuel is in a settled condition. From the intake the ejector will loft particles as a slurry off the top of the column of fuel and separate the particles in the centrifuge so that the particles settle downward to continue the cycle, whereas the fluid sodium with contaminants separates and is pumped out of the top of the reactor vessel through heat exchanger 41 and back into the ejector. Since that part of the reactor vessel which is not filled with fuel particulate is filled with molten sodium, a small amount of sodium is circulated with the particulate.

An important feature of this novel reactor is that some of the gaseous fission products can be removed as they form. The action of the sodium in the ejector and centrifuge has the effect of removing gases from the system in the manner well known in the art.

Figure 3:
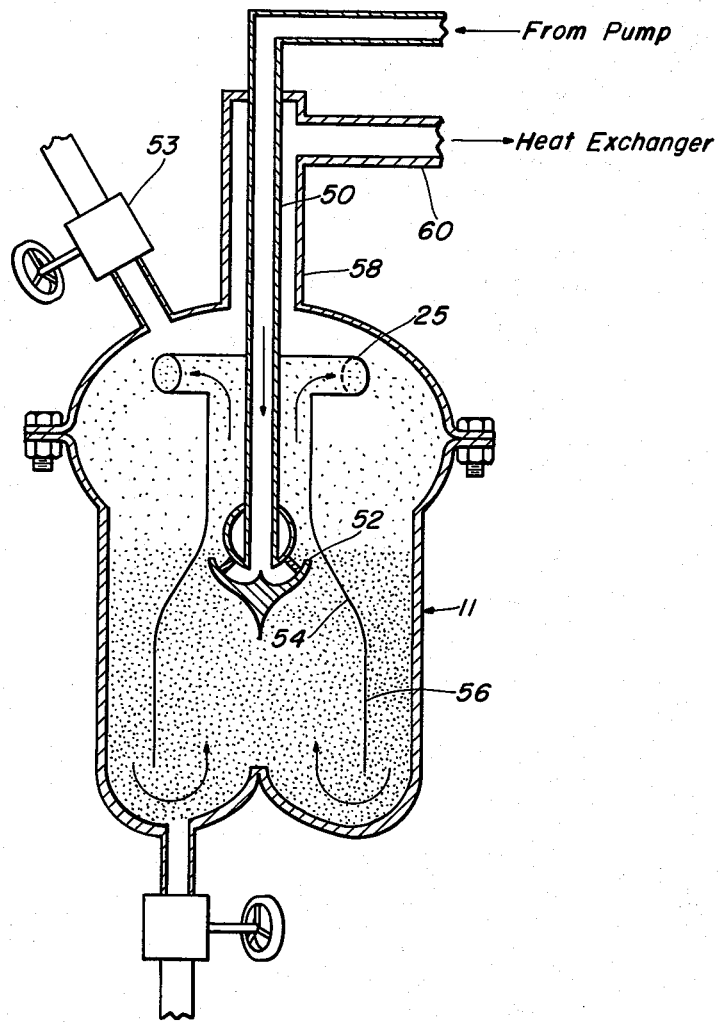
FIGURE 3 is a vertical cross-sectional view of an alternative embodiment.

The embodiment of FIGURE 3 avoids the presence of riser tube 31 in the nuclear reaction zone which will alter the heat generation profile. The sodium returning from the pump descends in duct 50 and through reentrant channel 52. The end of reentrant channel 52, together with the necked-in portion 54 of inner member 56, provides an ejector or jet pump. The slurry is picked up by the sodium and centrifuged out of orifices 25, as previously explained. Some of the heat is extracted from the fuel particles and conveyed in the hot sodium out through ducts 58 and 60 to the heat exchanger. Of course, some heat can be conducted through the wall 11 to a surrounding annulus filled with circulating sodium.

An additional advantage of the reactor of the present invention is that it may be operated at elevated temperatures without the use of a heavy pressure vessel because of the low vapor pressure of sodium.

When sodium has been purified so that the concentration of oxygen is very low, its rate of attack on stainless steels and other metals and alloys is quite low, in the 400 to 700° C. range. In general, stainless steel is preferred for all of the structural elements because of its strength and the advanced state of the skill in the art in its fabrication.

Some fission products are soluble in sodium and a portion of these will diffuse from the small fuel particles and become dissolved in the sodium. Hot trapping, cold trapping, distillation are methods of removing these impurities. Also this contaminated sodium could be discarded at intervals but this is not necessary because the same purification methods that remove chemical impurities to hold down the corrosion rate should reduce the concentration of the fission product contaminants.

Still another advantage of the reactor of the present invention lies in the fact that the fuel may be gradually renewed in the reactor without shutdown so that the spent fuel which is withdrawn can be continuously reprocessed.

It is understood that the spirit of this invention contemplates the utilization of a coolant and a fuel particulate and that the coolant and the particulate each have an independent circulatory path except for one common portion thereof. The coolant provides the function of transporting the particles into the circulatory path and to convey some of the heat generated to a point of utilization. Also this coolant brings about a partial inpile fuel reprocessing. Although these teachings have been applied to a specific example, it is apparent that other modifications and variations may be possible and it is our intention to cover any such modifications which fall within the spirit of this invention. It follows that this invention is to be considered limited only by the appended claims taken in view of the prior art.

What is claimed is:

1. A nuclear reactor utilizing a settled particulate fuel and an immiscible coolant comprising an outer vertically elongated closed vessel, a cylindrical member and a liquid centrifuge, said cylindrical member having its lower end open and being supported within the outer vessel so that the lower end thereof is spaced from the lower end of the closed vessel, said cylindrical member having a converging upper end, a tubular portion extending upward from the converging upper end and at its top being connected to said centrifuge, said centrifuge comprising at least one radial tube communicating with the upper end of the tubular portion and an orifice portion affixed to the outer end of the radial tube in tangential, substantially, relationship therewith, a coolant duct passing through a wall of the outer vessel and having an end portion supported in co-axial relationship with the cylindrical member converged upper end to provide a jet pump therewith, discharge coolant duct means communicating with the upper portion of said vessel, and hatch means at the upper end of the vessel adapted to admit nuclear fuel in particulate form, and discharge means at the bottom of said vessel.

2. A nuclear reactor utilizing a particulate fuel and an immiscible coolant comprising an outer vertically elongated vessel having a lower cylindrical portion and an upper dome-shaped portion, a vertically elongated cylindrical member supported within said vessel and having a necked-in portion at its upper end, a vertically elongated tubular member connected at its lower end to the upper end of the cylindrical member necked-in portion, at least one radial tubular arm connected at one end to the upper end of the tubular member and having a substantially tangential portion at the outer end, a duct for conveying coolant supported axially within said vessel and having a reduced in cross section upper end positioned within and in the zone of the necked-in portion of the cylindrical member to provide a jet pump, means for withdrawing coolant from the upper end of said vessel, means including a heat exchanger and a circulating pump for recirculating said coolant through said duct, said jet pump and said upper end of the vessel, and means for introducing a nuclear fuel in particulate form into said vessel.

3. A nuclear reactor utilizing nuclear fuel in powder form and an immiscible coolant, comprising an outer vertically elongated vessel having a lower cylindrical portion and an upper dome-shaped portion, a vertically elongated cylindrical member supported within said vessel and having a necked-in portion at its upper end, a vertically elongated tubular member connected at its lower end to the upper end of the cylindrical member necked-in portion, at least one radial tubular arm connected at one end to the upper end of the tubular member and having a substantially tangential portion at the outer end, a coolant duct for conveying coolant depending axially within said vessel and within said vertically elongated tubular member and terminating at the said necked-in portion of the cylindrical member, a reentrant circular duct connected to the said coolant duct terminal end at its central portion and having its outer peripheral portion directed upward whereby said reentrant duct portion and said cylindrical member necked-in portion provide a jet pump, means including a heat exchanger and a circulating pump connected to said coolant duct and the upper end of the dome-shaped portion for circulating coolant through said jet pump, means for inserting a powdered nuclear fuel in the upper end of the vessel.

References Cited in the file of this patent

Proceedings of 2nd Geneva Conf., vol. 9, pp. 441–446, 1958, publ. by U.N.

Proceedings of 1st Geneva Conf., vol. 3, pp. 116–120, 1955, publ. by U.N.